United States Patent
Tsujimoto et al.

(10) Patent No.: US 7,360,786 B2
(45) Date of Patent: Apr. 22, 2008

(54) HORN SWITCH DEVICE, AIRBAG SYSTEM, AND STEERING WHEEL

(75) Inventors: Kei Tsujimoto, Tokyo (JP); Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 169 days.

(21) Appl. No.: 11/282,728

(22) Filed: Nov. 21, 2005

(65) Prior Publication Data

US 2006/0131851 A1 Jun. 22, 2006

(30) Foreign Application Priority Data

| Dec. 17, 2004 | (JP) | ............................. 2004-366357 |
| Jan. 19, 2005 | (JP) | ............................. 2005-011774 |
| Jun. 23, 2005 | (JP) | ............................. 2005-183678 |

(51) Int. Cl.
    *B60R 21/203* (2006.01)
    *H01H 9/00* (2006.01)
(52) U.S. Cl. .................................. 280/731; 200/61.55
(58) Field of Classification Search ............... 280/731; 200/61.54, 61.55, 61.56
    See application file for complete search history.

(56) References Cited

U.S. PATENT DOCUMENTS

| 4,374,310 | A | * | 2/1983 | Kato et al. ................ 200/61.54 |
| 5,023,412 | A | * | 6/1991 | Ishida ....................... 200/61.54 |
| 5,410,114 | A | * | 4/1995 | Furuie et al. ............. 200/61.55 |
| 5,593,178 | A | * | 1/1997 | Shiga et al. ................ 280/731 |
| 5,627,352 | A | * | 5/1997 | Suzuki et al. ............. 200/61.54 |
| 5,650,600 | A | * | 7/1997 | Walters ..................... 200/61.54 |
| 6,139,051 | A | * | 10/2000 | Fujita ......................... 280/731 |
| 6,312,012 | B1 | * | 11/2001 | Bohn et al. ................. 280/731 |
| 6,478,330 | B2 | | 11/2002 | Fujita |
| 6,508,485 | B2 | * | 1/2003 | Kikuta et al. ............. 280/728.2 |
| 6,572,138 | B1 | * | 6/2003 | Bohn et al. ................. 280/731 |
| 6,688,637 | B2 | * | 2/2004 | Igawa et al. ............. 280/728.2 |
| 6,719,323 | B2 | | 4/2004 | Kai et al. |
| 6,722,227 | B2 | * | 4/2004 | Rabagliano et al. ........... 74/552 |
| 6,802,531 | B2 | * | 10/2004 | Bohn et al. ................. 280/731 |
| 6,871,870 | B2 | * | 3/2005 | Schneider et al. ....... 280/728.2 |
| 6,881,911 | B2 | * | 4/2005 | Sugimoto ................ 200/61.54 |
| 6,995,328 | B2 | * | 2/2006 | Sugimoto ................ 200/61.54 |
| 7,012,202 | B2 | * | 3/2006 | Mizukoshi ............... 200/61.54 |
| 7,111,868 | B2 | * | 9/2006 | Schutz ........................ 280/731 |
| 7,159,897 | B2 | * | 1/2007 | Worrell et al. ............. 280/731 |

(Continued)

FOREIGN PATENT DOCUMENTS

FR 1471447 3/1967

(Continued)

*Primary Examiner*—Paul N. Dickson
*Assistant Examiner*—Timothy D. Wilhelm
(74) *Attorney, Agent, or Firm*—Manabu Kanesaka

(57) ABSTRACT

A horn switch device includes a retractable body, an unmoving body facing the retractable body, a biasing member between the retractable body and the unmoving body, a pair of contact members attached to, and moving with, the retractable body, and a contacting body, formed on the unmoving body, for contacting one of the contact members when the retractable body retracts. The contacting body stops the retraction of the contacted contact member, thereby bringing the contact members into contact with each other so as to sound the horn. The horn switch device facilitates positioning of the contact members relative to each other, thereby simplifying the assembly of a steering wheel and an airbag system.

11 Claims, 4 Drawing Sheets

U.S. PATENT DOCUMENTS

| | | | |
|---|---|---|---|
| 7,173,202 B2 * | 2/2007 | Tsujimoto et al. | 200/61.54 |
| 7,268,309 B2 * | 9/2007 | Sugimoto | 200/61.54 |
| 2001/0035631 A1 * | 11/2001 | Hasebe | 280/728.2 |
| 2002/0153714 A1 * | 10/2002 | Kreuzer | 280/731 |
| 2004/0046367 A1 * | 3/2004 | Scheider et al. | 280/728.2 |
| 2004/0090052 A1 * | 5/2004 | Sugimoto | 280/731 |
| 2005/0012311 A1 * | 1/2005 | Schneider et al. | 280/731 |
| 2006/0226639 A1 * | 10/2006 | Chapelain et al. | 280/731 |

FOREIGN PATENT DOCUMENTS

| | | | |
|---|---|---|---|
| JP | 10100832 A | 4/1998 |
| JP | 11278280 A | 10/1999 |
| JP | 2001187576 A | 7/2001 |
| JP | 2001199300 A | 7/2001 |
| JP | 2001213326 A | 8/2001 |
| JP | 2001233159 A | 8/2001 |
| JP | 2001277976 A | 10/2001 |
| JP | 2001278060 A | 10/2001 |

* cited by examiner

HORN SWITCH DEVICE, AIRBAG SYSTEM, AND STEERING WHEEL

BACKGROUND OF THE INVENTION AND RELATED ART STATEMENT

The present invention relates to a horn switch, and in particular, it relates to a horn switch device provided in an airbag system and constructed such that, when depressed, a module cover is retracted to turn on a horn switch. The invention also relates to an airbag system and a steering wheel that include the horn switch device.

Driver-seat airbag systems mounted to car steering wheels are known in which when the module covers of the airbag systems are depressed, horn switches are turned on to sound horns. For example, Japanese Unexamined Patent Application Publication No. 10-100832 and Japanese Unexamined Patent Application Publication No. 2001-114057 describe airbag systems in which, when depressed, a module cover is retracted to turn on a horn switch.

In the conventional horn switch devices, however, one of the contact members is mounted to the module cover, and the other is mounted to a retainer. The separate contact members increase the difficulty associated with assembly work to position the contact members with high accuracy.

Accordingly, it is an object of the present invention to provide a horn switch device in which a pair of contact members is provided only on one of a retractable body such as a module cover, and an unmoving body such as a retainer or a steering wheel. Thus, the contact members can be easily positioned.

It is also an object of the present invention to provide an airbag system and a steering wheel that include the horn switch device.

Further objects and advantages of the invention will be apparent from the following description of the invention and the associated drawings.

SUMMARY OF THE INVENTION

A horn switch device according to the present invention includes a retractable body that is retracted by depression by an occupant; an unmoving body that faces the retractable body; a biasing member interposed between the retractable body and the unmoving body, for biasing the retractable body in the restoring direction; and a pair of contact members which comes into or out of contact with each other by the movement of the retractable body. Both of the pair of contact members move together with the retractable body. The unmoving body has a contacting body that comes into contact with one of the contact members when the retractable body retracts, to stop the retraction of the contact member, thereby bringing the contact members into contact with each other.

According to a first embodiment of the horn switch device, the retractable body is a module cover of an airbag system.

In the first embodiment of the invention, the unmoving body is a member extending from a retainer of the airbag system.

According to a second embodiment of the horn switch device, the retractable body is an airbag system.

In the second embodiment of the invention, the unmoving body is a steering wheel or a member extending from the steering wheel.

In another embodiment of the invention, an airbag system includes a horn switch device according to one of the first and second embodiments of the invention.

In another embodiment of the invention, a steering wheel includes a horn switch device according to one of the first and second embodiments of the invention.

In still another embodiment of the invention, a steering is equipped with an airbag system that includes a horn switch device according to one of the first and second embodiments of the invention.

In the horn switch device according to the invention, the contact members are apart from each other when the retractable body, such as a module cover or an airbag system, is in a restored position (undepressed state). When the retractable body is depressed, one of the contact members comes into contact with the contacting body to bring the contact members into contact with each other, thereby sounding the horn.

In the horn switch device, the contact members are provided only to the retractable body. Accordingly, the contact members can easily be positioned, thereby improving the workability in assembling the airbag system, the steering wheel, etc.

In the invention, the retractable body may be either a module cover or an airbag system. When the retractable body is a module cover, the unmoving body is preferably a member extending from a retainer. When the retractable body is an airbag system, the unmoving member is preferably a steering wheel or a member extending from the steering wheel.

DETAILED DESCRIPTION OF THE PREFERRED EMBODIMENTS

Embodiments of the present invention will be specifically described hereinafter with reference to the accompanying drawings.

Figure 1:
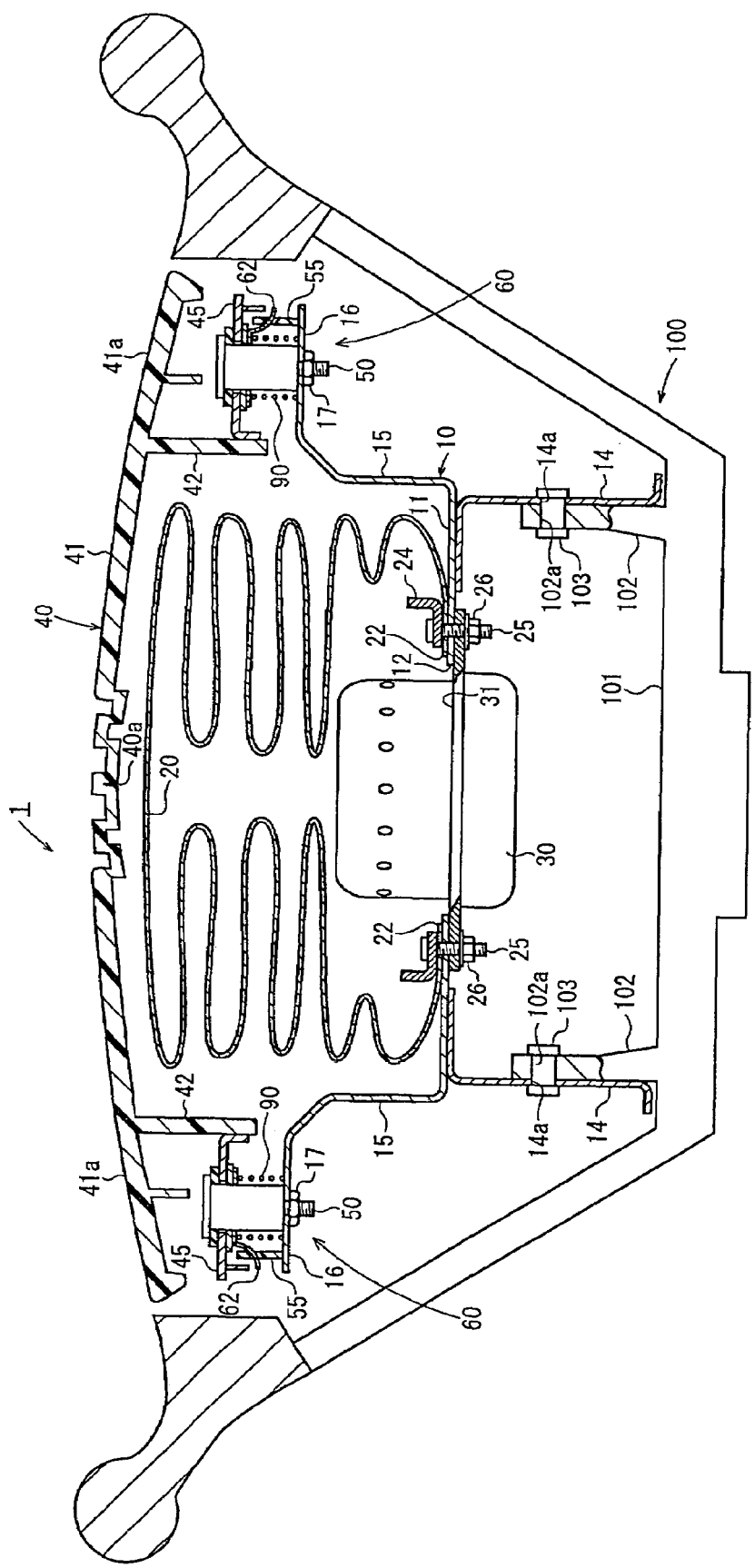
FIG. 1 is a cross-sectional view of a steering wheel equipped with an airbag system including a horn switch device according to a first embodiment of the present invention.

FIG. 1 is a cross-sectional view of a steering wheel equipped with an airbag system including a horn switch device according to a first embodiment of the present invention.

Figure 2A:
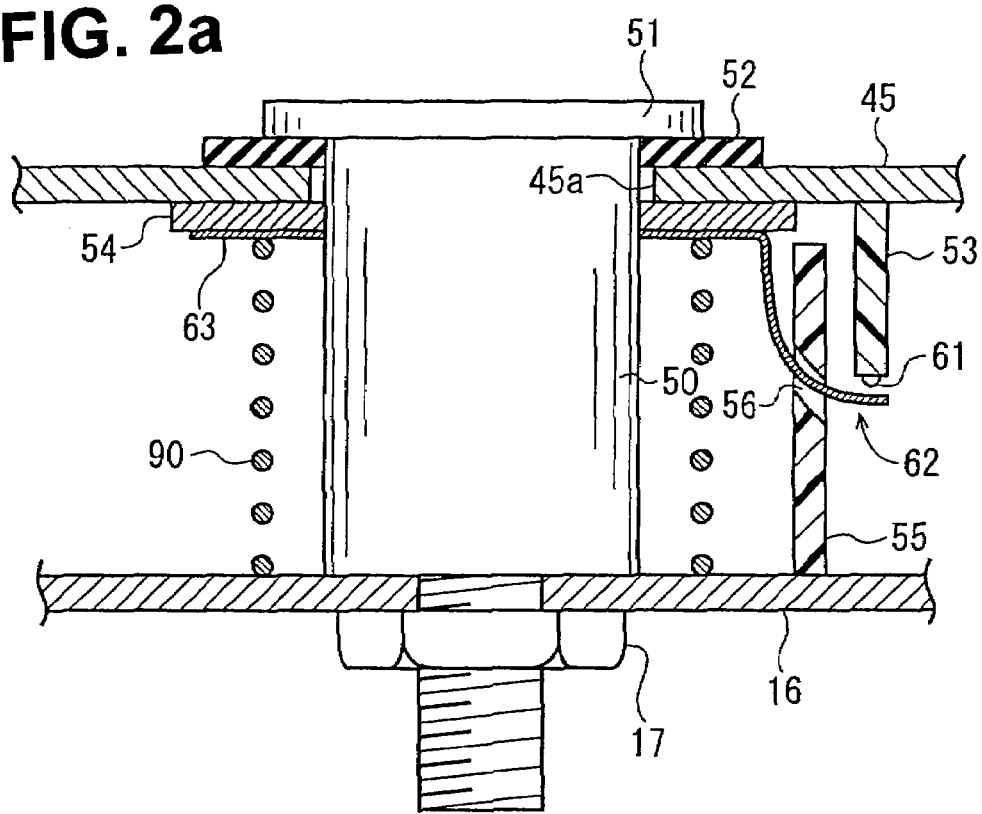
FIGS. 2(a) and 2(b) are cross-sectional views of the horn switch device depicted in FIG. 1.
Figure 2B:
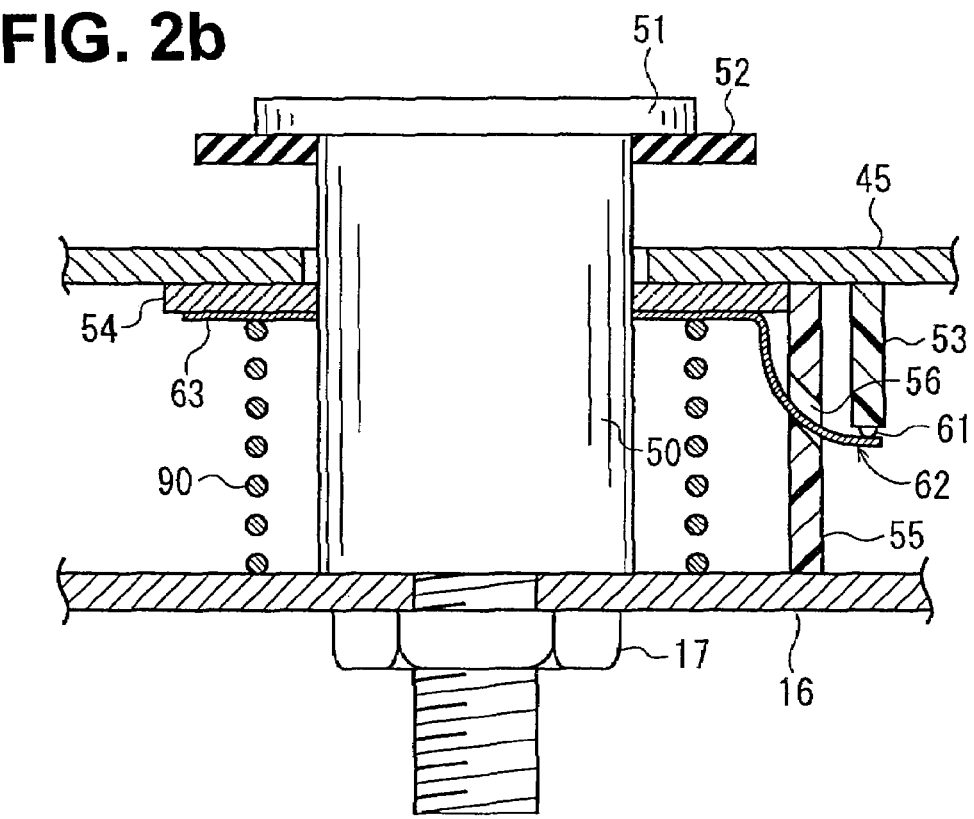

FIGS. 2(a) and 2(b) are enlarged views of the horn switch device depicted in FIG. 1. FIG. 2(a) shows "an undepressed" state in which a module cover 40 is not depressed, and FIG. 2(b) shows "a module-cover depressed state" in which the module cover 40 is depressed to sound a horn.

The airbag system 1 is a driver-seat airbag system disposed in the center (a base 101) of a steering wheel 100. The airbag system 1 includes a metal retainer 10, an airbag 20 mounted to the retainer 10 with an airbag-fixing ring 24, an inflator 30 for inflating the airbag 20, a synthetic-resin module cover 40 that covers the folded airbag 20, and a horn switch device 60.

According to the first embodiment of the invention, the module cover 40 is a retractable body. The module cover 40 has a groove-like tear line 40a. When the airbag 20 is inflated by the inflator 30, the module cover 40 is cleaved along the tear line 40a.

The retainer 10 has a substantially rectangular main plate 11. The main plate 11 has an opening 12 for the inflator 30 to pass through. Around the opening 12 are provided through holes for stud bolts 25 extending from the airbag-fixing ring 24.

An anchor piece 14 extends downward (i.e., in FIG. 1, in the direction opposite to the occupant of the vehicle) from the outer rim of the main plate 11 of the retainer 10. The anchor piece 14 is used to fix the airbag system 1 to the steering wheel 100. The anchor piece 14 has openings 14a for bolts or rivets to pass through. The steering wheel 100 has an airbag-system mounting piece 102 rising from the base 101 thereof. The mounting piece 102 also has an opening 102a for a bolt or a rivet to pass through.

In mounting the airbag system 1 to the steering wheel 100, the anchor piece 14 is placed on the mounting piece 102, and they are joined with a bolt or a rivet 103 through the openings 14a and 102a. The openings 14a and 102a may be screw sections for bolts.

An enclosure 15 extends upward (i.e., in FIG. 1, toward the occupant) from the outer rim of the main plate 11 of the retainer 10. An extension 16 extends laterally (to the side of the airbag system 1) from the distal end of the enclosure 15 in the standing direction. In this embodiment, the extension 16 is an unmoving body.

To the extension 16 is fixed a nut 17, to which the lower end of a guide shaft 50 is threaded.

The airbag 20 has a structure in which the periphery of an inflator insertion hole 22 thereof is placed on the periphery of the inflator opening 12 of the retainer main plate 11, on which the airbag-fixing ring 24 is placed. The stud bolts 25 are passed through the bolt insertion holes provided around the inflator insertion hole 22 of the airbag 20. Each stud bolt 25 is then passed through a bolt insertion hole of the retainer 10. The stud bolt 25 is then passed through a bolt insertion hole of a flange 31 of the inflator 30, on which a nut 26 is tightened. The airbag 20 and the inflator 30 are thus fixed to the retainer 10.

The module cover 40 has a main surface 41 that faces the occupant, and a leg 42 extending from the back of the main surface 41. The leg 42 is molded integrally with the main surface 41 by injection molding of synthetic resin, and has a substantially rectangular frame shape similar to the enclosure 15 of the retainer 10. The periphery 41a of the main surface 41 overhangs outward from the leg 42.

The leg 42 provides a mount for an overhang 45. The overhang 45 extends outward in the direction perpendicular to the direction in which the module cover 40 retracts. The overhang 45 has an opening 45a for the guide shaft 50 to pass through.

As shown in FIGS. 2(a) and 2(b), the lower end of the guide shaft 50 is threaded into the nut 17 of the extension 16 to be fixed to the extension 16, and extends from the extension 16 toward the occupant. The guide shaft 50 projects upward relative to the overhang 45 through the opening 45a and has a flange 51 at the upper end as a stopper. Between the flange 51 and the overhang 45 is interposed a washer 52 made of an electrical insulation material such as rubber.

An electrically insulating pedestal 53 extends downward from the lower end of the overhang 45 in parallel with the guide shaft 50. A projecting first contact member 61 is provided at the lower end of the pedestal 53.

A ring 63 is disposed under the lower surface of the overhang 45 via a flat washer 54. The washer 54 and the ring 63 are disposed coaxially, through which the guide shaft 50 passes. A coil spring 90 is interposed between the ring 63 and the extension 16 while having a reserve of energy. The biasing force of the coil spring 90 pushes the washer 54 and the ring 63 against the overhang 45.

A second contact member 62 extends from the ring 63. The second contact member 62 extends toward the extension 16 in a downward slanting direction with increasing distance from the ring 63. The second contact member 62 curves to extend out toward the guide shaft 50 relative to a line that connects the distal end and the base end.

A contacting body 55 rises from the upper surface of the extension 16 in parallel with the guide shaft 50. The contacting body 55 is located between the pedestal 53 and the guide shaft 50. The contacting body 55 has a window 56 in the middle. The second contact member 62 passes through the window 56 to extend to the position below the first contact member 61.

As shown in FIG. 2(a), before the module cover 40 is depressed, the second contact member 62 is located at a specified distance apart from the lower rim of the window 56.

The horn-sounding action of the steering wheel 100 equipped with the airbag system 1 including the horn switch device 60 will now be described.

As shown in FIG. 2(a), before the module cover 40 is depressed, the second contact member 62 is apart from the first contact member 61.

When the module cover 40 is depressed, the overhang 45 is pushed down, so that the first and second contact members 61 and 62 descend together. With the descent, the coil spring 90 is compressed.

The extension 16 extends from the retainer 10 fixed to the steering wheel 100, so that the extension 16 is not displaced even if the module cover 40 is depressed. Also the guide shaft 50 fixed to the extension 16 is not displaced.

As the first and second contact members 61 and 62 are pushed down, the second contact member 62 is brought into contact with the lower rim of the window 56, so that further descent of the second contact member 62 is stopped. Since the first contact member 61 continues descending thereafter, the contact members 61 and 62 come into contact with each other. Thus, the horn switch device 60 is turned on to sound the horn.

On release from the module cover 40, the first and second contact members 61 and 62 and the module cover 40 are pushed up by the repulsive force of the coil spring 90 into the state shown in FIG. 2(a). The contact members 61 and 62 are thus pushed open to stop sounding the horn.

In the horn switch device 60, as described above, both of the first and second contact members 61 and 62 are mounted to or supported by the module cover 40, so that they can be positioned easily and accurately. This reduces the difficulty in assembling the horn switch device 60 or the airbag system 1.

Figure 3:
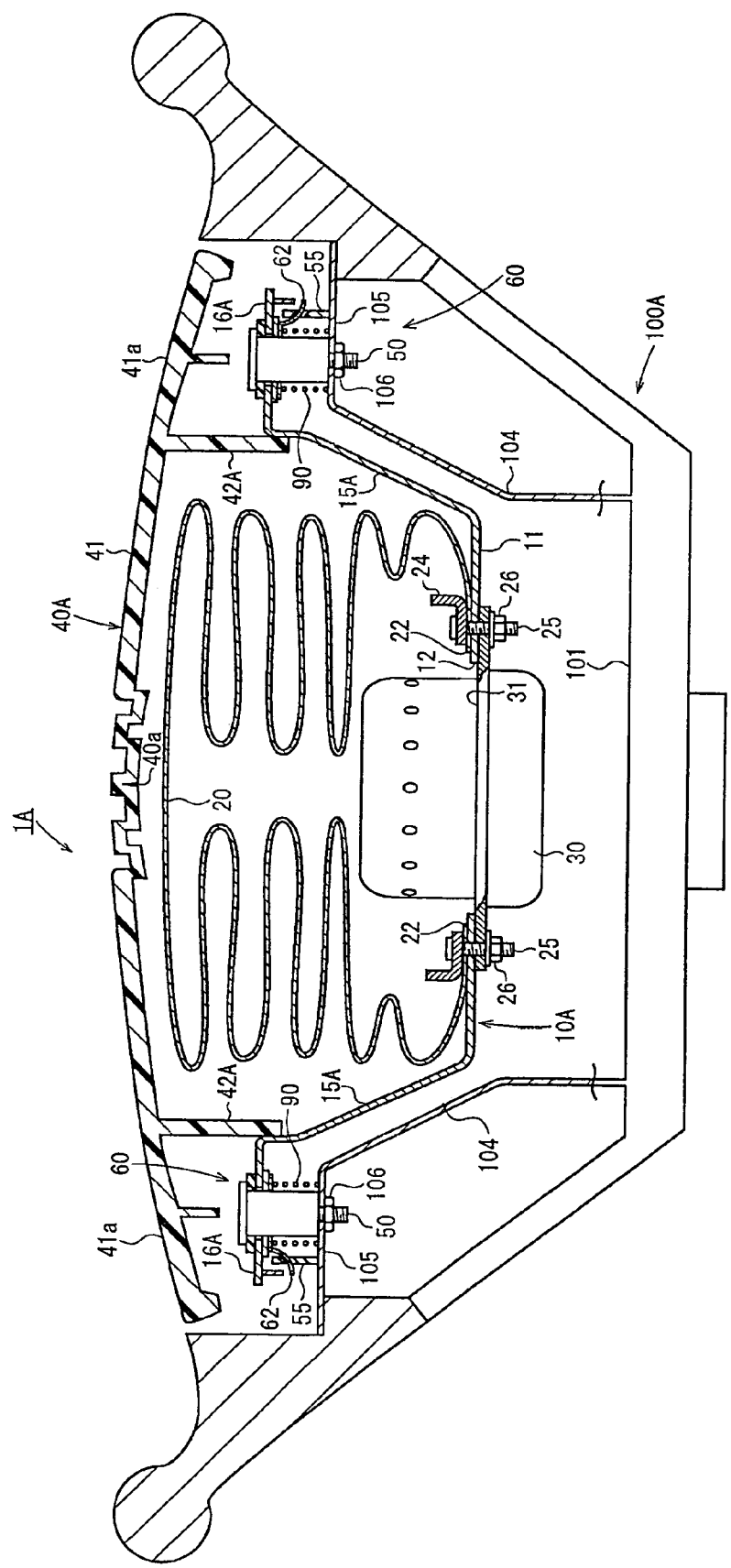
FIG. 3 is a cross-sectional view of a steering wheel equipped with an airbag system including a horn switch device according to a second embodiment of the present invention.
Figure 4A:
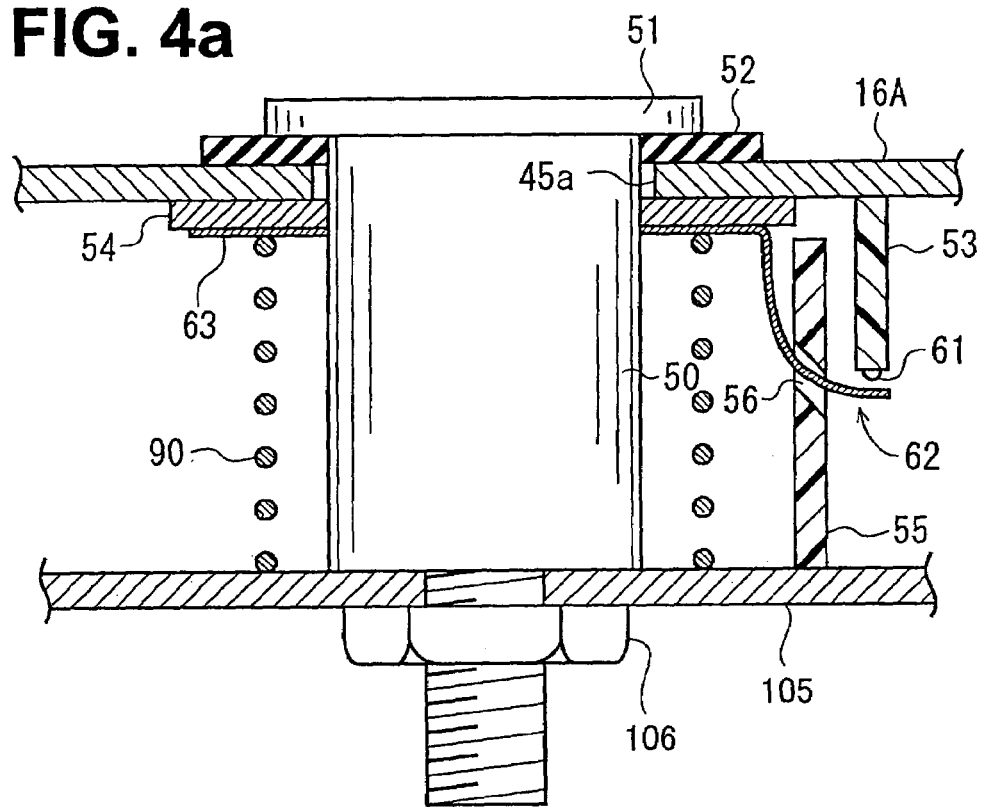
FIGS. 4(a) and 4(b) are cross-sectional views of the horn switch device depicted in FIG. 3.
Figure 4B:
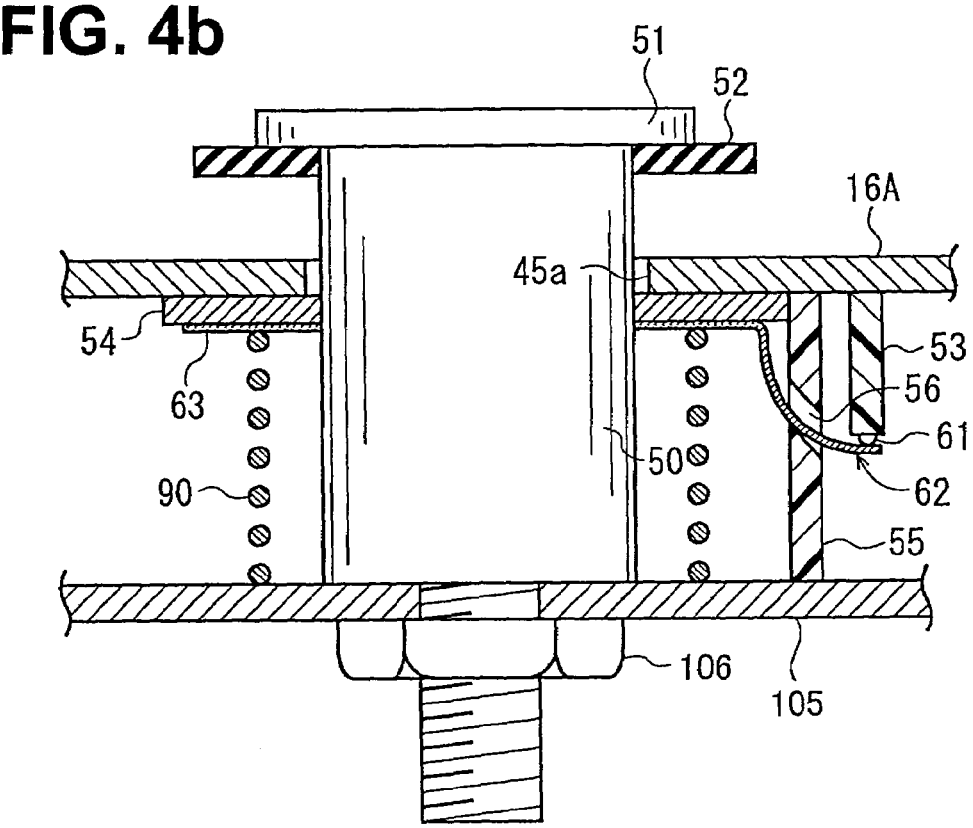

While the above-described first embodiment has a structure in which only the module cover is retracted by depression, the invention can also be applied to an airbag system in which the module cover and the retainer move vertically together. FIG. 3 is a cross-sectional view of a steering wheel 100A equipped with an airbag system 1A with such a structure according to a second embodiment of the invention. FIGS. 4(a) and 4(b) are enlarged views of the horn switch device depicted in FIG. 3. FIG. 4(a) shows "an undepressed" state in which a module cover is not depressed, and FIG. 4(b) shows "a module-cover depressed state" in which the module cover is depressed to sound a horn.

The airbag system 1A also includes a retainer 10A, an airbag 20 mounted to the retainer 10A with a ring 24, an inflator 30 for inflating the airbag 20, a module cover 40A that covers the folded airbag 20, and a horn switch device 60. According to this second embodiment of the invention, the entire airbag system 1A is a retractable body.

The retainer 10A of this embodiment also has a substantially rectangular main plate 11. The airbag 20 and the inflator 30 are mounted to the main plate 11, whose mounting structure is the same as that of the airbag system 1 depicted in FIG. 1.

An enclosure 15A extends upward (i.e., in FIG. 3, toward the occupant) from the outer rim of the main plate 11 of the retainer 10A. An extension 16A extends laterally (i.e., to the side of the airbag system 1A or in the direction perpendicular to the direction in which the airbag system 1A retracts (vertically in FIG. 3)), from the distal end of the enclosure 15A in the standing direction.

The module cover 40A has a main surface 41 that faces the occupant and a leg 42A extending downward (i.e., in FIG. 3, in the direction opposite to the occupant) along the inner wall of the enclosure 15A from the back of the main surface 41. The leg 42A is fixed to the enclosure 15A with a fixing member (not shown) such as a rivet.

In this second embodiment, airbag-system supporting pieces 104 extend from the steering wheel 100A along the outer wall of the enclosure 15A. The supporting pieces 104 are provided in a number equal to the number of extensions 16A, and are disposed such that the respective ends face the extensions 16A from below. At the end of each supporting piece 104 is provided a facing part 105 that extends to the side of the airbag system 1A (in parallel with the direction in which the extension 16A extends) and faces the lower surface of the extension 16A. In this embodiment, the facing part 105 is an unmoving body. To the facing part 105, a nut 106 for fixing a guide shaft is fixed.

In this embodiment, the extension 16A has an opening 45a (see FIGS. 4(a) and 4(b)), through which the guide shaft 50 passes. The lower end of the guide shaft 50 is threaded into the nut 106 at the facing part 105 to be fixed to the facing part 105, and extends upward from the facing part 105. Also in this embodiment, a flange 51 is provided as a stopper at the upper end of the guide shaft 50. Between the flange 51 and the extension 16A is interposed an electrically insulating washer 52 made of rubber or the like.

In this second embodiment, a horn switch device 60 is disposed between the extension 16A and the facing part 105. The horn switch device 60 is substantially the same as that shown in FIGS. 2(a) and 2(b). In this embodiment, the overhang 45 in FIGS. 2(a) and 2(b) is replaced with the extension 16A, and the extension 16 is replaced with the facing part 105.

Specifically, in this embodiment, the pedestal 53 having the first contact member 61 projects from the lower surface of the extension 16A, as shown in FIGS. 4(a) and 4(b). The ring 63 is disposed below the lower surface of the extension 16A via the flat washer 54, through the openings of which the guide shaft 50 passes. A coil spring 90 is interposed between the ring 63 and the facing part 105 while having a reserve of energy. The washer 54 and the ring 63 are pushed against the extension 16A and held by the biasing force of the coil spring 90. The contacting body 55 of this embodiment extends from the upper surface of the facing part 105.

The other structures of this second embodiment are the same as those of the first embodiment depicted in FIGS. 1 and 2(a) and 2(b). The same reference numerals of FIGS. 3 and 4(a) and 4(b) as those of FIGS. 1 and 2(a) and 2(b) indicate the same components.

The horn-sounding action of the steering wheel 100A equipped with the airbag system 1A having this horn switch device 60 will be described.

As shown in FIG. 4(a), before the module cover 40A is depressed, the second contact member 62 is apart from the first contact member 61.

When the module cover 40A is depressed, the entire airbag system 1A is pushed downward. Along with that, the extension 16A and the first and second contact members 61 and 62 descend together. With the descent, the coil spring 90 is compressed.

The facing part 105 is integrated with the steering wheel 100A, so that the facing part 105 is not displaced even if the module cover 40A is depressed. Also the guide shaft 50 fixed to the facing part 105 is not displaced.

As the first and second contact members 61 and 62 are pushed down, the second contact member 62 comes into contact with the lower rim of the window 56, so that further descent of the second contact member 62 is stopped. Since the first contact member 61 continues descending thereafter, the contact members 61 and 62 come into contact with each other. Thus, the horn switch device 60 is turned on to sound the horn.

On release from the module cover 40A, the first and second contact members 61 and 62 and the extension 16A are pushed up by the repulsive force of the coil spring 90 to return to the state shown in FIG. 4(a). This opens the contact members 61 and 62 to stop sounding the horn. Along with that, the entire airbag system 1A returns to the initial position.

Also in this second embodiment, both of the first and second contact members 61 and 62 are mounted to or supported by the airbag system 1A, so that they can be positioned easily and accurately. This reduces the difficulty in assembling the horn switch device 60 or the airbag system 1A.

The disclosures of Japanese Patent Application Nos. 2004-366357 filed on Dec. 17, 2004; 2005-11774 filed on Jan. 19, 2005; and 2005-183678 filed on Jun. 23, 2005, are incorporated herein.

What is claimed is:

1. A horn switch device comprising:
  a retractable body capable of being retracted by depression, said retractable body having an insulating pedestal extending downwardly therefrom;
  an unmoving body facing said retractable body and having a contacting body extending toward the retractable body adjacent the insulating pedestal so as to stop retraction of the retractable body when the retractably body is retracted, said contacting body having a window therein;
  a biasing member interposed between said retractable body and said unmoving body, for biasing said retractable body in a restoring direction; and
  first and second contact members both being attached to, and moving with, said retractable body, and capable of contacting each other by movement of said retractable body, said first contact member being attached to a lower end of the insulating pedestal, and said second contact member extending obliquely to completely pass through the window and being located immediately below the first contact member when the retractable body is not retracted so that when the retractable body is retracted, the first contact member descends and contacts the second contact member.

2. The horn switch device according to claim 1, wherein said retractable body is a module cover of an airbag system.

3. The horn switch device according to claim 2, wherein said unmoving body is a member extending from a retainer of the airbag system.

4. The horn switch device according to claim 1, wherein said retractable body is an airbag system.

5. The horn switch device according to claim 4, wherein said unmoving body is a steering wheel or a member extending from said steering wheel.

6. The horn switch device according to claim 1, further comprising a guide shaft fixed to said unmoving body, said first and second contact members being slideable relative to the guide shaft and biased in one position by said biasing member.

7. The horn switch device according to claim 6, wherein said contacting body is located adjacent to the guide shaft, and said second contact member passes through the window while restricting movement thereof.

8. An airbag system comprising a horn switch device, wherein said horn switch device is the horn switch device according to claim 1.

9. A steering wheel comprising a horn switch device, wherein said horn switch device is the horn switch device according to claim 1.

10. A steering wheel equipped with an airbag system comprising a horn switch device, wherein said airbag system is the airbag system according to claim 8.

11. The horn switch device according to claim 1, wherein said insulating pedestal is arranged vertically without bending laterally when the retractable body is retracted.

* * * * *